US010641648B2

(12) United States Patent
Landini (10) Patent No.: US 10,641,648 B2
(45) Date of Patent: May 5, 2020

(54) WEIGHING METHOD FOR WEIGHING CONTAINERS OF PHARMACEUTICAL, MEDICAL, FOOD SUBSTANCES, AND THE LIKE

(71) Applicant: I.M.A. INDUSTRIA MACCHINE AUTOMATICHE S.P.A., Ozzano dell'Emilia (IT)

(72) Inventor: Massimo Landini, Imola (IT)

(73) Assignee: I.M.A. Industria Macchine Automatiche S.p.A. (IT)

( * ) Notice: Subject to any disclaimer, the term of this patent is extended or adjusted under 35 U.S.C. 154(b) by 233 days.

(21) Appl. No.: 15/568,499

(22) PCT Filed: Apr. 21, 2016

(86) PCT No.: PCT/IB2016/052260
§ 371 (c)(1),
(2) Date: Oct. 23, 2017

(87) PCT Pub. No.: WO2016/170488
PCT Pub. Date: Oct. 27, 2016

(65) Prior Publication Data
US 2018/0156658 A1 Jun. 7, 2018

(30) Foreign Application Priority Data
Apr. 21, 2015 (IT) .............................. MI2015A0570

(51) Int. Cl.
*G01G 21/28* (2006.01)
*G01G 17/00* (2006.01)
(Continued)

(52) U.S. Cl.
CPC ............. *G01G 23/14* (2013.01); *G01G 17/00* (2013.01); *G01G 21/28* (2013.01); *G01G 23/01* (2013.01)

(58) Field of Classification Search
CPC ...... G01G 21/26; G01G 23/01; G01G 23/012; G01G 23/05; G01G 23/017; G01G 17/00; G01G 21/28
(Continued)

(56) References Cited

U.S. PATENT DOCUMENTS 2,699,329 A * 1/1955 Bean ......................... B07C 5/16
177/50
3,001,598 A * 9/1961 Henzler .................... B07C 5/16
177/264
(Continued)

FOREIGN PATENT DOCUMENTS

| EP | 2851060 A2 | 3/2015 |
| JP | 2008070282 A | 3/2008 |
| JP | 2005-45314 A | 12/2015 |

*Primary Examiner* — Randy W Gibson
(74) *Attorney, Agent, or Firm* — Laubscher & Laubscher, P.C.

(57) ABSTRACT

A weighing method for weighing containers of pharmaceutical, medical, food substances and the like, in which the containers are subject to the action of an air flow uses a weighing unit provided with two or more weighing devices and weighing containers filled with a desired quantity of substance. The weighing containers occupy respective weighing devices of the weighing unit. A weight value of said containers obtained from an actual weight value which is corrected by adopting a measurement error that estimates the effect of the action of the air flow is supplied.

17 Claims, 3 Drawing Sheets

(51) Int. Cl.
*G01G 23/01* (2006.01)
*G01G 23/14* (2006.01)

(58) Field of Classification Search
USPC .......................................... 177/262; 73/1.13
See application file for complete search history.

(56) References Cited

U.S. PATENT DOCUMENTS

| | | | | |
|---|---|---|---|---|
| 3,235,062 | A * | 2/1966 | Myers | G01G 21/26 |
| | | | | 206/305 |
| 5,602,485 | A * | 2/1997 | Mayer | B07C 5/28 |
| | | | | 177/210 C |
| 6,478,162 | B1 * | 11/2002 | Yamamoto | B07C 5/16 |
| | | | | 209/593 |
| 6,552,280 | B1 * | 4/2003 | Tellenbach | G01G 21/26 |
| | | | | 148/206 |
| 6,583,370 | B2 * | 6/2003 | Stoneberg | G01G 21/26 |
| | | | | 177/264 |
| 8,247,711 | B2 * | 8/2012 | Troisi | B67C 3/202 |
| | | | | 177/145 |
| 2012/0123721 | A1 | 5/2012 | Yeon et al. | |
| 2015/0034207 | A1 | 2/2015 | Boira Bonhora | |

* cited by examiner fig. 1 fig. 2 fig. 3 fig. 4 fig. 5 fig. 6 fig. 7

WEIGHING METHOD FOR WEIGHING CONTAINERS OF PHARMACEUTICAL, MEDICAL, FOOD SUBSTANCES, AND THE LIKE

CROSS REFERENCE TO EARLIER APPLICATION

This application is a § 371 National Stage Entry of PCT/IB2016/052260 filed Apr. 21, 2016 entitled "Weighing Method for Weighing Containers of Pharmaceutical, Medical, Food Substances, or Similar." PCT/IB2016/052260 claims priority to IT-MI2015A000570 filed Apr. 21, 2015. The entire contents of these applications are incorporated herein by reference in their entireties.

BACKGROUND OF THE INVENTION

Embodiments described herein relate to a weighing method for weighing containers having various forms, for example vials, bottles, and capsules containing various substances in the inside thereof, for example liquids, which are more or less viscous, powders, granules, tablets and the like, in particular in the pharmaceutical, medical or food sectors, where there is a great need for weighing precision, accuracy and repeatability.

BRIEF DESCRIPTION OF THE PRIOR ART

It is known that it is possible to insert in containers for pharmaceutical use substances or products, of various type and composition, such as powders, tablets, liquids, whether individually or together with others, in desired proportions.

However, such substances, if incorrectly dosed, may even be dangerous for the user.

It is known that an industrial line for filling containers in the pharmaceutical, medical or food sectors may include, in addition to an operating station for filling, a weighing apparatus for checking the quantity inserted in the containers. In that context, incorrect weighing of a medicine may result in serious risks for the health of a patient.

It is also known that in an industrial line of the type discussed, filling and weighing operations must be performed in an essentially sterile internal environment, protected with a controlled atmosphere as far as possible free of elements that may pollute or contaminate the substance in the containers. For that purpose, in addition to protecting the perimeter of the filling line using screens or walls that contain it, and supplying a sterile air filtering system, there is a known practice of generating inside the at least partly closed weighing chamber created in this way a laminar air flow forced from the top down which strikes the line components. The laminar air flow exits through lower or side perimetric slits owing to the pressure difference between the inside environment and outside environment, drawing with it dust, dirt, micro-particles or any other kind of air macro- or micro-pollutants.

Among the weighing systems discussed with the above-mentioned precision requirements, it is also known that factors outside of the weighing operation may affect its precision and repeatability, for example the air surrounding the weighing apparatus, its density, its pressure or local speed. Therefore, as well as monitoring and subsequently eliminating or reducing via software any intrinsic errors attributable to the weighing units, it is also necessary to consider variations due to environmental factors.

In particular, it has been found that even the laminar air flow from the top down may generate a weight measurement error in the weighing apparatus. For example, micro-vortices or local turbulences may be generated which may invalidate the measurement. Such a measurement error can be compensated via software. However, since it is not a constant and repeatable error due to differing conditions of local laminar flow interference with the line components, even that electronic compensation may not be sufficient.

Weighing apparatuses are known including weighing units which include two or more weighing devices, each able to detect the weight of a single container. Weighing methods are known, applied within the weighing systems discussed, in which during the weighing of one or more containers, at least one weighing device remains empty and is not used, that is to say, it is not occupied by a container to be weighed.

In this way it is possible during the weighing of a container to detect even the weight force acting on the unoccupied weighing device caused by the laminar air flow, by the particles present in the atmosphere, and by any other vibration, or intrinsic error of the weighing device, and to use this value as an estimate of the error present on each weighing device that is, in contrast, occupied by a container.

The weight value detected can therefore subsequently be processed using software and used as a "tare", that is to say, subtracting it from the value detected for each container, to measure only the weight due to the mass of the container itself and not that due to the above-mentioned environmental conditions. However, since the tolerances in the measurement are very small, even that methodological approach may not be sufficient to correctly determine the error to be considered.

In fact, the laminar air flow may act differently near the weighing devices occupied by containers and near the unoccupied weighing device or devices since the local turbulences generated may also depend on the type, shape and size of obstacles along the path of the air flow.

Therefore, it is necessary to improve a weighing method for weighing containers which can overcome at least one of the disadvantages of the prior art.

In particular, one aim of this invention is to provide a weighing method for weighing containers that is reliable and allows weight measurements to be obtained with very low error tolerances, limited to micrograms as required in the pharmaceutical field.

Therefore, one object is to provide a weighing method for obtaining a container weight measurement that is adjusted to compensate for measurement errors caused by the effect of the movements of air in the environment in which the containers are present.

SUMMARY OF THE INVENTION

Embodiments described herein relate to a weighing method for weighing containers of pharmaceutical, medical, food products and the like which are subject to the action of an air flow. According to one embodiment, the method includes the following steps:
 a) providing a weighing unit provided with two or more weighing devices;
 b) weighing containers filled with a desired quantity of substance, occupying respective weighing devices of the weighing unit, obtaining an actual weight value of the containers;
 c) weighing one or more reference sample containers having a known weight, shape and size, in particular defined beforehand and correlated with those of the containers to be weighed, occupying respective one or more weighing devices of the weighing unit, thereby obtaining an actual weight value of the one or more reference sample containers;

d) calculating a weighing error of the reference sample container or containers by comparing the actual weight value of the reference sample containers with a nominal weight value of the reference sample containers;

e) estimating a measurement error of the weight of the containers filled with a desired quantity of substance, assuming the measurement error of the weight of the filled containers to be equal to the weighing error calculated for the reference sample containers; and f) correcting a weighing value detected for the filled containers on the basis of the measurement error of the weight of the containers, the error being estimated using the reference sample containers.

Step c) of weighing reference sample containers may occur with the sample containers filled with a desired quantity of substance or with the reference sample containers empty.

The expression actual weight value means a weight value measured by a weighing device.

In accordance with various embodiments, step b) of weighing filled containers may be carried out before or after step c) of weighing one or more reference sample containers, or the steps b) and c) may be carried out simultaneously.

In accordance with another embodiment, the method may include weighing at least one reference sample container and at least one filled container to be weighed which occupy respective weighing devices of a single weighing unit.

According to a further embodiment, the weighing method includes weighing at least two reference sample containers associated with the weighing devices located in the end positions of the weighing unit along the advancing direction, and one or more containers occupying respective weighing devices of a single weighing unit. Weighing more than one reference sample container reduces the incidence that the position selected for the reference sample containers may have on the measurement error of the weight of the containers processed.

According to another embodiment, in the case of two or more separate weighing units, the weighing method includes weighing at least one reference sample container which occupies a predetermined weighing device and acts as a reference for all of the weighing units and one or more containers to be weighed which occupy respective weighing devices of the various weighing units.

According to a further embodiment, in the case of two or more separate weighing units, the weighing method includes weighing at least one reference sample container, occupying a predetermined weighing device for each weighing unit, and weighing one or more containers to be weighed, occupying respective weighing devices of the various weighing units.

According to yet another embodiment, in the case of two or more separate weighing units, the weighing method includes weighing a number of reference sample containers that is greater than one and less than the number of weighing devices of the various weighing units, and at least one container to be weighed.

According to further embodiments, the method according to this invention may also include detecting the actual weight of the containers to be weighed and of the reference sample containers by respective sensor units associated with each weighing device and sending the data relating to the actual weight measurement to a control unit.

According to still further embodiments, the method according to this invention may also include saving the expected or nominal or known weight value of the reference sample containers in an electronic database connected to the control unit and using the expected or known weight value to calculate, by the control unit, the measurement error of the weight of the reference sample containers.

According to further embodiments, if more than one reference sample container is weighed in step b), then in step d) for the actual weight value of the reference sample containers, it is possible to use the arithmetical mean of the values weighed for each of the reference sample containers in step b).

In accordance with another embodiment, a weighing apparatus for weighing containers of pharmaceutical, medical, food substances and the like is provided. The apparatus includes:

a weighing unit provided with two or more weighing devices for weighing containers filled with a desired quantity of substance, in such a way as to obtain an actual weight value of the containers;

the weighing unit also being provided with a further one or more weighing devices for weighing one or more reference sample containers which have a known weight, shape and size, in particular defined beforehand and correlated with those of the containers, in such a way as to obtain an actual weight value of the reference sample containers; and a control unit configured for:

calculating a weighing error of the reference sample container or containers by comparing the actual weight value of the reference sample containers with a nominal weight value of the reference sample containers;

estimating a measurement error of the weight of the containers filled with a desired quantity of substance, assuming the measurement error of the weight of the filled container to be equal to the weighing error calculated for the reference sample containers; and correcting a weighing value detected for the filled containers based on the measurement error of the weight of the containers estimated using the reference sample containers.

In accordance with further embodiments, a computer program is provided which can be saved in a medium that can be read by a computer or the like, containing the instructions that, once run by a weighing apparatus, cause the execution of the weighing method according to this invention.

These and other aspects, characteristics and advantages of this disclosure will be more apparent with reference to the following description, to the drawings and to the appended claims. The drawings, which are integrated with and form part of this description, illustrate some embodiments of the subject matter of this invention and, together with the description, describe the principles of the disclosure.

BRIEF DESCRIPTION OF THE DRAWINGS

These and other characteristics of this invention will appear clear from the following description of embodiments, supplied by way of non-limiting example, with reference to the appended drawings, in which.

For easier understanding, identical reference numerals have been used, where possible, to identify identical common elements in the figures. It shall be understood that elements and characteristics of one embodiment may be appropriately incorporated in other embodiments without further clarification.

DETAILED DESCRIPTION

Embodiments described herein using the appended figures relate to a weighing method for weighing containers 12 containing substances which may be powdered, liquids, in the form of tablets and the like, for example pharmaceutical, medical, food products and the like.

Appended FIGS. 1 to 7 are used to describe a weighing apparatus 10 for weighing containers 12 in which embodiments of the method described herein can be implemented.

In accordance with one embodiment, the weighing method described herein includes the following steps:

a) providing a weighing unit 20 having two or more weighing devices 30;

b) weighing containers 12 filled with a desired quantity of substance, occupying respective weighing devices 30 of the weighing unit 20, obtaining an actual weight value of said containers 12 to be weighed;

c) weighing one or more reference sample containers 14 having a known weight, shape and size, in particular defined beforehand and correlated with those of the containers 12 to be weighed, occupying respective remaining further one or more weighing devices 30 of the weighing unit 20 which are not occupied by the containers 12 to be weighed, obtaining an actual weight value of said reference sample containers 14;

d) calculating a weighing error of the reference sample container or containers 14 by comparing the actual weight value of the reference sample containers 14 with a nominal weight value of the reference sample containers 14;

e) estimating a measurement error of the weight of the containers 12 filled with a desired quantity of substance, assuming the measurement error of the weight to be equal to the weighing error calculated for the reference sample containers 14; and f) correcting a weighing value detected for the filled containers 12 on the basis of the measurement error of the weight of the containers 12, the error being estimated using the reference sample containers 14.

In this way, it is possible to accurately estimate the error introduced by the environment in which the containers 12 are located in the measurement of the weight of the containers 12 themselves.

In this description, in the case of the shape and size of the reference samples 14, the term "correlated" means, for example, that they are equal to, or substantially equal to a nominal shape and nominal size of the containers 12 to be weighed. In the case of the weight, the term "correlated" means a weight of the reference samples 14 that is equal to, or substantially equal to a nominal weight of the containers 12 to be weighed, or to an expected or desired weight, or that is different but has a known reference value. For example, for the weight, reference may be made to the nominal weight of an empty container 12, or to the nominal weight of a full container 12, the latter being able to be the sum of the nominal weight of an empty container 12 and the nominal weight of the product dosed that one wants to obtain in the filled container.

The choice of a reference sample container with a weight equal to or substantially equal to the nominal weight of the filled containers 12 allows a reduction in any intrinsic measurement error of the weighing device 30. In fact, the latter is usually selected in such a way that its weighing characteristic curve has the highest performance, corresponding to a lower error in a range of weight values within which the expected or nominal weight of the containers 12 falls. The weight of the filled reference sample container therefore falls within the same range of weight values as the nominal weight of the filled container 12.

With reference to the weight of the reference sample container, the term "substantially equal to" means that the weight of the reference sample container may differ from the expected or nominal weight of the containers processed by a quantity that is less than the minimum measurement error tolerable in the weight of the containers.

The weight of each of the containers 12 is given by the sum of the weight due to the mass of the containers 12 on which the force of gravity acts and the forces that act on the measuring device used, due to vibrations, to the air flows, to the fine dust present in the air, and/or to an intrinsic error of the measuring instrument itself.

Consequently, since the tolerances required in weight measurements in the pharmaceutical, medical, food or similar sectors may be very restrictive, typically of the magnitude of micrograms, it may be important to accurately identify the error introduced by the surrounding environment on the weighing apparatus 10, and in particular on the individual measuring devices 30, since, although it may be small relative to the actual weight of the containers 12, it is variable and not known beforehand, and may affect the measurement of the weight of the containers 12 in a way that is not easily controllable.

In accordance with one embodiment, step b) of weighing filled containers 12 may be carried out before or after step c) of weighing one or more reference sample containers 14, or the steps b) and c) may be carried out simultaneously.

According to another embodiment, if more than one reference sample container 14 is weighed in step b), then in step d) for the actual weight value of the reference sample containers 14 it is possible to use the arithmetical mean of the values weighed for each of the reference sample containers 14 in step b). That arithmetical mean of the weight value of the reference sample containers 14 may, therefore, be used to calculate the weighing error of the reference sample container or containers 14 in step d) and, therefore, to carry out steps e), f).

Referring to FIGS. 1 to 7, the weighing apparatus 10 for weighing containers, which may be used to implement embodiments of the method described herein, includes at least one container weighing unit 20.

The weighing apparatus 10 for weighing containers also includes a container advancing device 16, configured to advance at least one row of containers 12, conveying them along an advancing direction F.

The weighing apparatus 10 for weighing containers in which the weighing method described herein may be implemented may be an apparatus used in the pharmaceutical sector, requiring a high level of precision in the assessment of the weight of containers, typically of the magnitude of micrograms, and specifically of the substances contained in them, and is usually isolated from the outside environment, to obtain a controlled atmosphere.

The weighing apparatus 10 may include a covering and protecting structure 40 which contains and protects at least the one or more weighing units 20 and the container advancing device 16.

Figure 1:
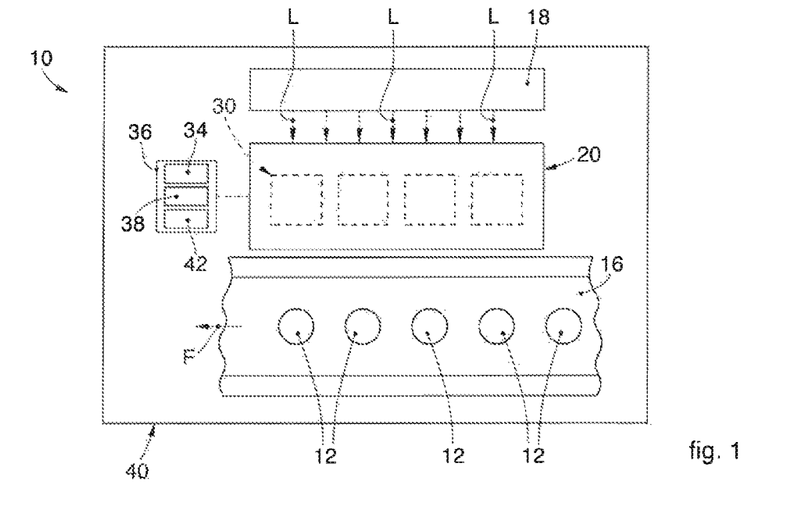
FIG. 1 is a schematic top plan view of a weighing apparatus in which embodiments of the method described herein can be implemented.
Figure 3:
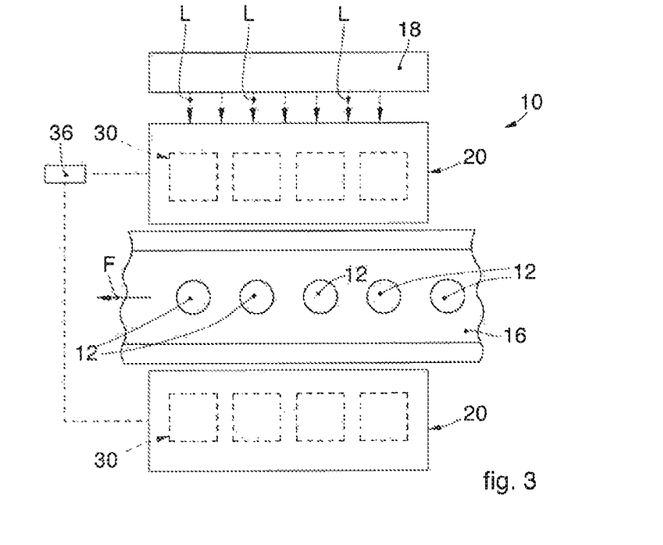
FIG. 3 is a schematic top plan view of a weighing apparatus in which further embodiments of the method described herein can be implemented.

Referring to FIGS. 1 and 3, and combinable with all of the embodiments described herein, the apparatus 10 may also include a laminar flow generating unit 18 configured for generating a controlled laminar air flow L inside the covering and protecting structure 40 which usually travels from the top down, exploiting the pressure difference between the inside environment and the outside environment.

Figure 2:
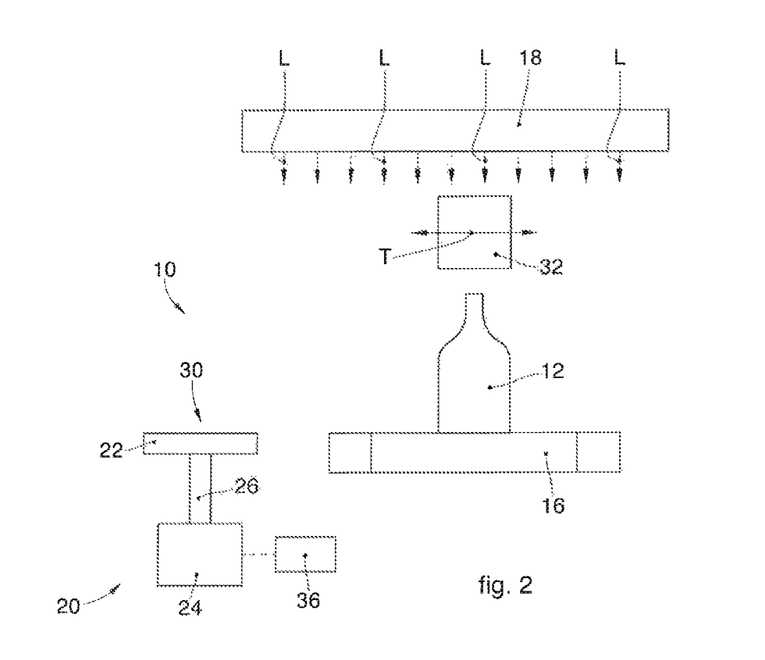
FIG. 2 is a schematic front view of a weighing apparatus in which embodiments of the method described herein can be implemented.
Figure 4:
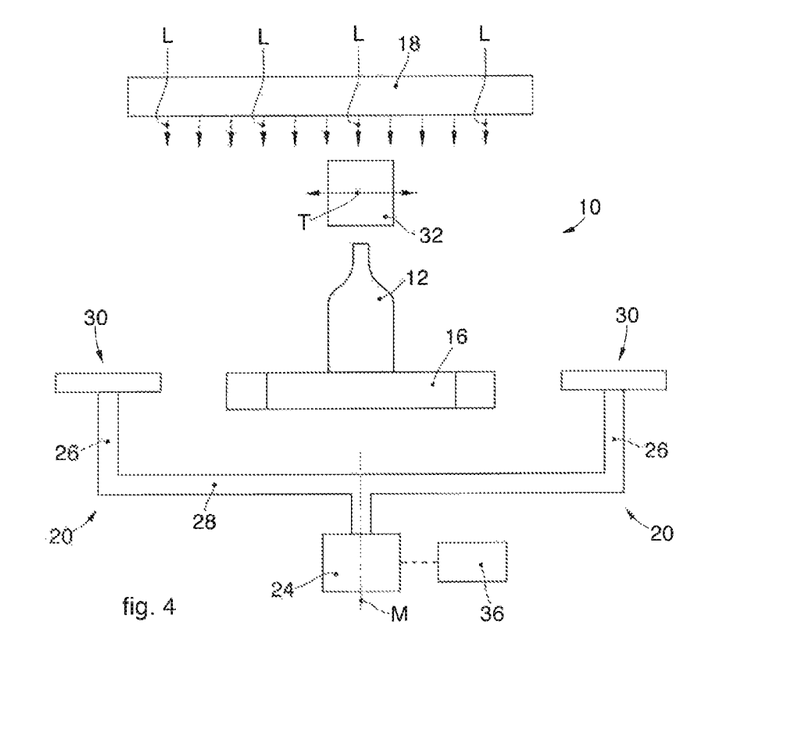
FIG. 4 is a schematic front view of a weighing apparatus according to further embodiments described herein.

In embodiments shown in FIGS. 2 and 4, combinable with all of the embodiments described herein, a container weighing unit 20 usable in the embodiments described herein may include a container support 22 and a sensor unit 24 configured to detect a weight force acting on the container support 22.

For example, and without limiting the scope of any of the embodiments, a container support 22 of the type used in the embodiments described herein may be a flat plate, a supporting dish, a disk, a portion of the container advancing device 16, a container-holder, a pedestal or other support suitable for supporting the container.

In some embodiments supplied by way of non-limiting example, the sensor unit 24 may comprise one or more sensors for detecting the weight force.

It should be noticed that one or more of the sensors included in the sensor unit 24 as used in the embodiments described herein may be at least one sensor element selected from the group including:
- a force sensor or transducer, such as a load cell, for example a load cell with a strain gauge, a hydraulic or hydrostatic load cell, a piezoelectric load cell, a vibrating wire load cell and a capacitive load cell; and
- a pressure sensor or transducer, for example of the electronic type generally used for collecting a force for measuring deformation or deviation caused by the force applied above an area, such as a sensor with a piezoresistive strain gauge, a capacitive sensor, an electromagnetic sensor, a piezoelectric sensor, an optical sensor or a potentiometric sensor.

Depending on the specific position of the sensor unit 24, the sensor unit may even include at least one pressure sensor and at least one force sensor, for example a load cell.

According to different implementations of the embodiments described herein, the weight force on the container support 22 may be detected by one or more load cells, one or more pressure sensors or one or more other sensors, which use a strain gauge, a piezoelectric element, a piezoresistive element, a Hall effect element, or the like. With that, it must be considered that a pressure is the force applied per unit surface area, in such a way that depending whether one or more sensors are used such as pressure sensors or as force sensors or load cells, a conversion may have to be considered.

In accordance with possible implementations, the sensor unit 24 may be a sensor unit that is independent of what applies the pressure or force. For example, the sensor does not activate, move or affect the container 12, the container support 22, or any other part or portion of the apparatus 10.

In accordance with embodiments described herein, examples of a container advancing device 16 may be a conveying device, in particular a closed loop conveyor, a closed loop conveyor belt, a supporting surface, or table, movable by a linear motor, a band or belt for conveying inside a filling line for filling pharmaceutical, medical or food containers.

According to other embodiments, there may be provided an actuating element for driving the container advancing device 16. The actuating element may include a driving unit configured to move the containers, which is made to operate by an energy source, for example electricity, hydraulic fluid pressure or pneumatic pressure.

The actuating element may be made to operate to cause advancing and arresting steps of the container advancing device 16. For example, there may be provided an arresting step for transferring containers 12 from the container advancing device 16 to the weighing unit 20.

Figure 7:
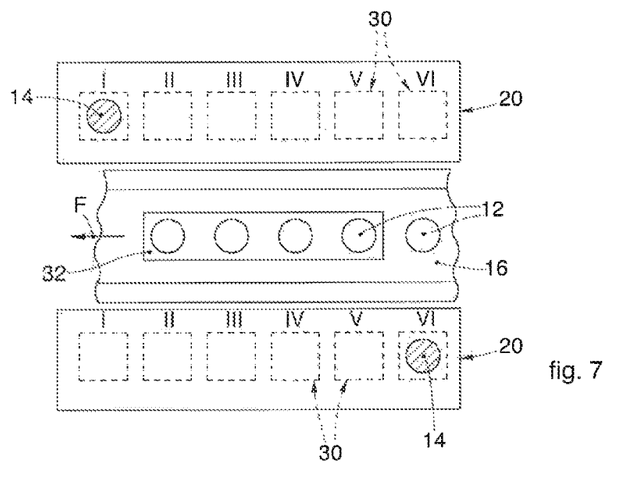
FIG. 7 is a schematic top plan view of a weighing apparatus in which further embodiments of the method described herein can be implemented.

FIGS. 3, 4 and 7 illustrate further embodiments, combinable with all of the embodiments described herein, of the apparatus 10 usable for implementing the method according to this description, which may include two weighing units 20 positioned on opposite sides of the container advancing device 16 on one side and on the other relative to the advancing direction F.

According to further embodiments, the apparatus 10 may also include a number of weighing units 20 greater than or equal to two, for example one or two weighing units 20 for weighing 100% of containers and one or two weighing units 20 for statistical weighing.

In possible implementations, a weighing unit 20 usable in the embodiments described herein may include two or more weighing devices 30 each of which is provided for checking the weight of a specific container 12.

Each weighing device 30 includes the above-mentioned container support 22, a sustaining element or rod 26 suitable for sustaining the container support 22 and the above-mentioned sensor unit 24. The sensor unit 24 may be dedicated for each weighing device 30, or it may be shared between coordinated pairs of weighing devices 30, for example which are positioned aligned on one side and the other of the container advancing device 16, transverse to the advancing direction F as shown in FIGS. 3 and 4.

Therefore, the sensor unit 24 may serve both a weighing device 30 of a weighing unit 20 on one side of the container advancing device 16 and a homologous and aligned other weighing device 30 of the other weighing unit 20 positioned on the opposite side.

In contrast, within the same weighing unit 20, each weighing device 30 is served by its own sensor unit 24, that is to say, there is no sharing of a sensor unit 24 between weighing devices 30 belonging to the same weighing unit 20.

For example, in the embodiments in which there are two weighing devices 30 one belonging to one weighing unit 20 and one to the other weighing unit 20, positioned aligned on one side and the other of the container advancing device 16, transverse to the advancing direction F, there may be provided a supporting element 28, arranged transverse to the advancing direction F of the container advancing device 16, which supports the sustaining element 26 and the container support 22 as shown for example in FIG. 4.

The supporting element 28 has an axis of symmetry M, which for example may advantageously be located at the longitudinal center line of the container advancing device 16, that is to say, at the advancing direction F. The respective sustaining element 26 and container support 22 may be located in positions symmetrical relative to said the axis of symmetry M.

In embodiments shown in FIGS. 2, 4, 6 and 7, the apparatus 10 may include a container transferring device 32 configured to transfer the containers 12 from the container advancing device 16 to the weighing unit 20 and vice versa, along a transferring direction T.

The container transferring device 32 may include one or more transferring members, or arms, for example combs, or translating bars, or elements that lift and translate, for example retaining the containers 12 by means of suction, or any type of known positioning member.

The transferring device 32 may be configured to move a group of containers including a predetermined number of containers 12 with each transferring operation, for example two, three, four, five, six or even more than six containers. The transferring device 32, in particular, may be configured to transfer a number of containers 12 that is less than the number of weighing devices 30 present in a container weighing unit 20.

Figure 5:
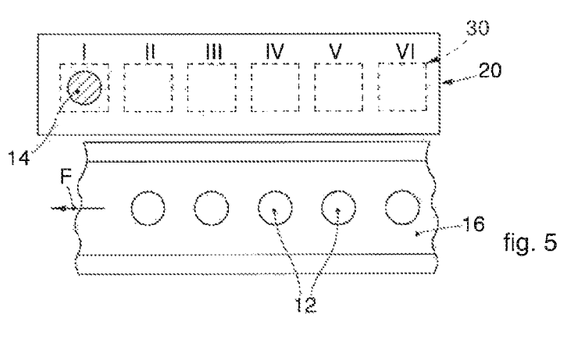
FIG. 5 is a schematic top plan view of a weighing apparatus in which still further embodiments of the method described herein can be implemented.
Figure 6:
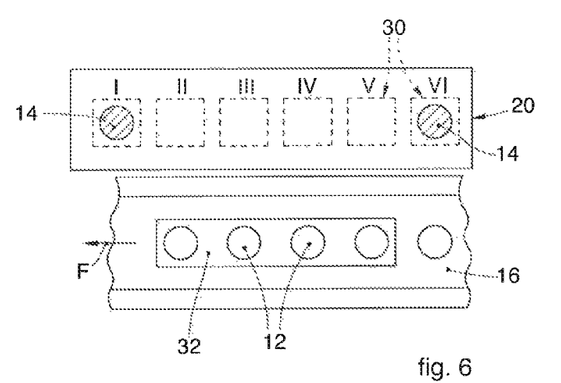
FIG. 6 is a schematic top plan view of a weighing apparatus in which other embodiments of the method described herein can be implemented.

In accordance with possible implementations, the number of weighing devices 30 may be equal to six as shown in FIGS. 5 to 7, but the number may be higher, for example a number between six and ten, or higher than ten, or lower, for example a number between two and six as shown in FIGS. 1 and 3.

The method described herein includes weighing at least one reference sample container 14 and at least one container 12 to be weighed, which occupy, for example simultaneously, respective weighing devices 30 of a weighing unit 20.

In accordance with another embodiment, the method described herein includes simultaneously occupying at least one weighing device 30 with one reference sample container 14 and at least one weighing device 30 with a container 12 to be weighed. The weighing of the sample container or containers 14 and the weighing of the container or containers 12 may be carried out simultaneously. In accordance with an alternate embodiment, the weighing of the sample containers 14 and the weighing of the container 12 may be carried out one after another.

As shown in FIGS. 6 and 7, the transferring device 32 may be configured to shift a number of containers 12 that is one or two less than the number of weighing devices 30. In this way, by numbering the positions of the weighing devices 30 in ascending order from I to VI, for example only the weighing devices 30 in positions I to V, or from II to VI, or even from II to V or from II to VI are used for weighing the containers 12.

Therefore, the number of weighing devices 30 occupied for weighing the containers 12 is less than the total number of weighing devices 30 of a weighing unit 20.

The choice of using the weighing devices 30 located at the ends for the reference sample containers 14 may be made in order to simplify feeding of the weighing units 20 with the containers 12, without having to include slowing or empty spaces between the containers 12 which are positioned on the container advancing device 16. It shall be understood that any other type of choice may be made regarding which weighing devices 30 are to be occupied with the reference sample containers 14.

The reference sample containers 14 positioned on the weighing devices 30 located in the end portions of a weighing unit 20 may be used to obtain an estimate of the overall error acting on the weighing unit 20, caused, for example, by vibrations, by the laminar air flow and in general by the surrounding environment, to be used for correcting the measurement of the weight of the containers 12, so that it is more accurate.

The reference sample containers 14, used as a reference for estimating the intrinsic error affecting the weight measurement, may be substantially equal in shape and size to the containers 12 to be weighed. In possible implementations, the weight of the reference sample containers 14 may be substantially equal to the weight that the containers 12 to be weighed should have, that is to say, an expected or nominal weight value, and is usually a known value. According to further embodiments, the weight of the reference sample containers 14 may be different to the weight of the filled containers 12, for example, equal to the weight of the empty containers 12, that is to say, which have not been filled with any substance. In general, the shape, size and weight of the reference sample containers 14 may be essentially equal to those of the filled containers 12. However, it is possible that they may be the same in terms of only shape and size, while the weight could be different.

For example, for each type, in terms of shape and size, of container 12 to be weighed, it is possible to use a reference sample container 14 that is similar or essentially equal to the container 12 to be weighed in terms of weight, shape and size.

In implementations of the method described herein, at the start of each weighing cycle the reference sample containers 14 are positioned on respective weighing devices 30 and are kept positioned on them during weighing of the containers 12 on the other weighing devices 30, until the containers 12 to be weighed of a predetermined type are finished, or the weighing operations are interrupted.

Since the above-mentioned laminar air flow generated by the laminar air flow generating unit 18, descending from the top downwards, may create vortices or differentiated local flow and pressure conditions, even though they are only small, the air flow near the containers 12 to be weighed may not be uniform and this lack of uniformity may be difficult to foresee and to repeat. To overcome this, a measurement error is estimated for the weight of the containers 12 using the weighing devices 30 occupied by the reference sample containers 14, whose behavior is similar to that of the weighing devices 30 on which, on each occasion, the containers 12 to be weighed are positioned.

In particular, it has been determined through experimentation that to a first approximation, the laminar air flows, and in general the environment in which the apparatus 10 is located, act in the same way on the containers 12 to be weighed and on the reference sample containers 14, consequently affecting in an approximately identical or similar way the operations for weighing the containers 12 and the reference sample containers 14. In other words, using reference sample containers 14 having a shape and size that are substantially equal to the nominal shape and size of the containers 12 processed, the surrounding environment acts on the reference sample containers to a first approximation—that is to say, not considering the position of the reference sample containers 14—in the same way as on the containers 12 to be weighed, or the related difference in behavior is, to a first approximation, acceptable.

In this way, it has been determined through experimentation that the measurement of the actual weight detected using the sensor unit 24 relative to each weighing device 30 occupied with a reference sample container 14 allows an estimate of the weighing measurement error that is better and more accurate than that which would be obtained, for example, using as a reference empty weighing devices 30 which are not occupied by containers to be weighed, which would be affected by the laminar air flow and by the surrounding environment in a way that is different, in contrast to how the weighing devices 30 occupied by the containers 12 to be weighed are affected.

In fact, since the shape of the empty weighing devices 30 is not comparable or similar to that of the weighing devices 30 occupied by the containers 12 to be weighed, detection of the error with the empty weighing devices 30 may not be as precise as that obtained with the weighing devices 30 occupied by the containers 12 or by the reference sample containers 14.

Moreover, selecting a reference sample container 14 which has a weight equal to or substantially equal to the desired weight of the containers 12 when they are filled allows a reduction in the measurement error caused by lower performance of the weighing device 30 which may have a weighing characteristic curve with improved performance for weights close to the desired weight of the filled containers 12.

The weighing of the containers 12 and the weighing of the sample containers 14 are carried out simultaneously. In this way, the estimate of the measurement error of the weight of the containers 12 may be even more accurate, since it is carried out based on the error of weight of the reference sample containers 14, assessed and calculated under the same environmental conditions that act in the same moment on both the containers 12 to be weighed and on the reference sample containers 14.

The actual weight value detected by the sensor units 24 associated with the weighing devices 30 occupied by reference sample containers 14 may be processed using software to manage in a reliable and repeatable way the measurement error caused locally by the laminar air flow and by the environment.

For that purpose, there may be provided a control unit, or system controller 36, that is configured to receive a signal relating to a weight measurement detected from each sensor unit 24 as shown in FIGS. 1 to 4. The control unit 36 is configured to receive in particular the weight detected by each sensor unit 24 associated with the one or more weighing devices 30 occupied by reference sample containers 14 in such a way as to use that value to precisely estimate the error that affects the measurement of the other weighing devices 30 which, in contrast, are occupied by the containers 12 to be weighed.

In particular, the control unit 36 may be configured to calculate a weighing error by comparing the actual weight value of the reference sample containers 14 with the expected or nominal or known weight value of said reference sample containers 14. The result obtained is used as an estimate of the error on the weight measurement values detected by each sensor unit 24 associated with the weighing devices 30 for each container 12 actually weighed.

One or more reference sample containers 14 may be used. The choice of the number of reference sample containers 14 may be made, for example, based on the type of weighing apparatus 10 in which the method is implemented.

Moreover, the number of reference sample containers 14 may be selected based on productivity requirements. For example, the more weighing devices 30 are used for the reference sample containers 14, the fewer weighing devices 30 are available for weighing the containers 12 so that the productivity of the line as a whole could be affected by this.

Weighing more than one reference sample container allows an increase in the precision of measurement of the weight of the containers 12 processed, reducing the effect, which may even be minimal and to a first approximation negligible, that the position selected for the reference sample containers may have.

According to the method described herein, the number of weighing devices 30 occupied by reference sample containers 14 is equal to the difference between the total number of weighing devices 30 of the weighing unit 20 and the number of weighing devices 30 occupied for weighing the containers 12.

According to another embodiment, the number of weighing devices 30 occupied by reference sample containers 14 is less than the difference between the total number of weighing devices 30 of the weighing unit 20 and the number of weighing devices 30 occupied for weighing the containers 12. It is thus possible to simultaneously have at least one weighing device 30 occupied by a reference sample container 14, one or more weighing devices 30 unoccupied and one or more weighing devices 30 occupied by respective containers 12 to be weighed, within one weighing unit 20.

For example, according to the embodiment shown in FIG. 5, the method may include weighing at least one reference sample container 14, and at least one container 12 to be weighed, which occupy respective weighing devices 30 of a single weighing unit 20. The reference sample container 14 may, for example, be placed on a weighing device 30 in position I. That position I may, for example, correspond to a position further forward along the advancing direction F. In this embodiment, positions II, III, IV, V and VI are, in contrast, occupied by the containers 12 to be weighed.

According to the embodiment shown in FIG. 6, the method may include weighing at least two reference sample containers 14 in position I and in position VI, in which position VI may, for example, correspond to a position further back along the advancing direction F. The positions I and VI may, therefore, be associated with the weighing devices 30 at the ends of a single weighing unit 20, along the advancing direction F. In this embodiment, positions II, III, IV and V, which are intermediate between positions I and VI, are in contrast occupied by the containers 12 to be weighed. In that embodiment, it is possible to obtain two estimate values of the measurement error, that is to say, from position I and from position VI, and, for example by calculating their arithmetical mean, it is possible to obtain an estimate of the weighing error that may, for example, even take into account possible variations of the laminar air flow between the two ends of a weighing unit 20.

According to a further embodiment, in the case of two or more separate weighing units 20, the weighing method may include weighing at least one reference sample container 14 which occupies a predetermined weighing device 30, and which acts as a reference for all of the weighing units 20, and one or more containers 12 which occupy respective weighing devices 30 of the various weighing units 20.

According to a further embodiment, in the case of two or more weighing units 20, the weighing method may include weighing at least one reference sample container 14 which occupies a predetermined weighing device 30 for each weighing unit 20, and one or more containers 12 which occupy respective weighing devices 30 of the various weighing units 20.

In case each weighing device 30 is associated with a respective sensor unit 24, the reference sample containers 14 may, for example, be positioned on any weighing device 30.

In case the weighing devices 30 aligned with each other of each weighing unit 20 share one sensor unit 24, the reference sample containers 14 may be positioned one on a weighing device 30 of one weighing unit 20, and one on a weighing device 30 of the other weighing unit 20, which are not aligned with each other.

According to the embodiment shown in FIG. 7, the reference sample containers 14 may be placed on either side of the advancing direction F, in respective weighing units 20. For example, in some implementations, such reference sample containers 14 may be placed in positions transversely aligned on either side of the advancing direction F. Moreover, in some implementations, the reference sample containers 14 may be placed in "crossed" configurations on either side of the advancing direction F. For example, there may be provided at least one reference sample container 14 that occupies a weighing device 30 located at the end of one weighing unit 20, for example in position I further forward along the advancing direction F, and another reference sample container 14 that occupies a weighing device 30 located at the opposite end of a different weighing unit 20 on the other side, for example in position VI further back along the advancing direction F, or vice versa, or even a crossed configuration in intermediate positions, for example positions II or III on one side and respectively positions V and IV on the other side.

In this way, it is possible to detect two reference weight measurements relating to reference sample containers 14 positioned on both sides of the container advancing device 16, for example aligned transversely or crossed as shown in FIG. 7, for example at the start and end of the weighing units 20 and, by calculating the arithmetical mean of the two values, it is possible to obtain an accurate estimate of the weighing error which takes into account possible variations in the laminar air flow from one side to the other of the container advancing device 16 and/or between the start and end of the weighing units 20.

According to another embodiment, in the case of two or more separate weighing units 20, the weighing method may include weighing a number of reference sample containers 14 that is greater than one and less than the number of weighing devices 30 of the various weighing units 20 and at least one container 12.

The method according to this description may include carrying out checks either on the weight of 100% of the containers 12, or on a sample number of containers 12 based on any statistical analysis application.

According to the embodiment shown in FIG. 1, and combinable with all of the embodiments described herein, the above-mentioned control unit 36 may include a central processing unit, or CPU 34, an electronic memory 38, an electronic database 42 and auxiliary circuits or I/O devices, not shown.

For example, the CPU may be any type of computer processor usable in the information technology sector to control and process automation. The electronic memory 38 may be connected to the CPU 34 and may be one or more of those commercially available, such as a random access memory (RAM), a read only memory (ROM), a floppy disk, a hard drive, a mass storage device, or any other type of digital, local or remote storage. The software instructions and the data may, for example, be coded and saved in the electronic memory 38 for controlling the CPU 34.

The electronic database 42 may be connected to the CPU 34 and to the electronic memory 38, and may be used for saving the expected weight values, or the known weight values, of the reference sample containers 14 to be used for estimating the weight measurement error of the containers 12.

The CPU 34 may, therefore, receive an actual weight value of the reference sample containers 14 and compare this with the known weight value of the reference sample containers 14 saved in the electronic memory 42 to obtain the measurement error estimate.

In case two or more actual weight values of the reference sample containers 14 are received, the CPU 34 can compare each with the expected or nominal weight values of the respective reference sample container 14, and then calculate the mean of the error estimates, thereby obtaining a precise and accurate measurement error estimate.

Then, the CPU can use the measurement error estimate to correct the value of the actual weight of each container 12, and so supply a correct weight value of the containers 12.

Even the auxiliary circuits may be connected to the CPU 34, for helping the processor in the conventional way. The auxiliary circuits may include, for example, at least one of the following: cache circuits, power circuits, clock circuits, input/output circuitry, sub-systems, and the like.

A program (or computer instructions) that can be read by the control unit 36 can determine which tasks can be performed in accordance with the method according to this description. In some embodiments, the program is software that can be read by the control unit 36. The control unit 36 includes a code for generating and saving information and data entered or generated during the method.

The steps, passages and operations described above may be performed with instructions run by a machine, which cause the execution of predetermined steps by a general-purpose or special-purpose processor.

Alternatively, the steps, passages and operations may be performed by specific hardware components that contain hardware logic for performing the steps, or by any combination of programmed computers components and customised hardware components.

The method according to this description may be included in a computer program which can be saved in a medium that can be read by a computer containing the instructions that, once run by the weighing apparatus 10, cause the execution of the method discussed.

In particular, elements according to this invention may be supplied as media that can be read by a machine for saving the instructions that can be executed by the machine. The media that can be read by a machine may include, without limiting the scope of the invention, floppy disks, optical disks, CD-ROMs and magnetic—optical disks, ROM, RAM, EPROM, EEPROM, optical or magnetic boards, propagating devices or other types of media that can be read by a machine and are suitable for saving electronic data. For example, this invention may be downloaded as a computer program which can be transferred from a remote computer (for example, a server) to a computer that makes a request (for example, a client), using data signals produced with wave carriers or other propagating devices, via a communication connection such as a modem or a network connection.

It is clear that the weighing method for weighing containers described above may be subject to changes and/or additions to parts and/or steps without thereby departing from the scope of the inventive concept.

It is also clear that, although this invention has been described with reference to several specific examples, an expert in the field will certainly be able to produce many other equivalent forms of a weighing method for weighing containers.

Although what is described above refers to embodiments of the invention, other and further embodiments are possible, without thereby departing from its main scope of protection.

The invention claimed is:

1. A weighing method for weighing containers of pharmaceutical, medical, food substances, the containers being subject to an air flow, comprising the steps of
    a) providing a weighing unit having two or more weighing devices;
    b) placing said weighing unit within a covering and protecting structure to contain and protect said weighing unit;
    c) generating a laminar air flow in said covering and protecting structure;
    d) weighing containers filled with a desired quantity of substance, the containers occupying respective weighing devices of said weighing unit to obtain an actual weight value of said filled containers;
    e) weighing at least one reference sample container having a known weight, shape and size, said at least one reference sample container occupying respective remaining further at least one weighing device of the weighing unit to obtain an actual weight value of the at least one reference sample container;
    f) calculating a weighing error of the at least one reference sample container by comparing the actual weight value of the at least one reference sample containers with a nominal weight value of the at least one reference sample container;
    g) estimating a measurement error of the weight of the containers filled with a desired quantity of substance, said measurement error of the weight of the filled containers being equal to the weighing error calculated for the at least one reference sample containers; and
    h), correcting a weighing value detected for the filled containers on the basis of the measurement error of the weight of the containers estimated using the reference sample containers, wherein the filled containers and the at least one reference container are subjected to the action of the generated laminar air flow in said covering and protecting structure and have the same nominal shape and the same nominal size.

2. A weighing method as defined in claim 1, and further comprising the step of weighing at least one reference sample container and at least one filled container to be weighed which occupy respective weighing device of a single weighing unit.

3. A weighing method as defined in claim 1, and further comprising the step of weighing at least two reference sample containers associated with weighing devices located in end positions along an advancing direction of one single weighing unit and at least one container occupying respective weighing devices of said weighing unit.

4. A weighing method as defined in claim 1, and further comprising the steps of weighing at least one reference sample container which occupies a predetermined weighing device and which acts as a reference for said weighing unit and for further weighing units and weighing one or more containers occupying respective weighing devices of various weighing units, the number of weighing units being greater than one.

5. A weighing method as defined in claim 1, and further comprising the steps of weighing at least one reference sample container occupying a predetermined weighing device for each weighing unit and weighing at least one container occupying respective weighing device of various weighing units, the number of weighing units being greater than one.

6. A weighing method as defined in claim 1, and further comprising the step of weighing a number of reference sample containers greater than one and less than the number of weighing device of each of the various weighing units present and at least one container occupying respective weighing devices of various weighing units.

7. A weighing method as defined in claim 1, wherein step d) of weighing filled containers is performed before step e) of weighing at least one reference sample container.

8. A weighing method as defined in claim 1, wherein step d) of weighing filled containers is performed after step d) of weighing at least one reference sample container.

9. A weighing method as defined in claim 1, wherein step b) of weighing filled containers is performed simultaneously with step c) of weighing at least one reference sample container.

10. A weighing method as defined in claim 1, wherein a measurement of said actual weight values of the containers and the reference sample containers is detected by sensor units associated with each of said weighing devices occupied by the containers and the reference sample containers, respectively.

11. A weighing method as defined in claim 10, and further comprising the step of sending data relating to measurement of the actual weight of the containers and of the reference sample containers detected by said sensor units to a control unit configured to process the data received from said sensor units.

12. A weighing method as defined in claim 11, and further comprising the steps of saving said nominal weight value of the reference sample containers in an electronic database connected with said control unit and using said nominal weight value to calculate in said control unit the weighing error of the reference sample containers.

13. A weighing method as defined in claim 1, wherein the at least one reference sample container has the same shape and size as the containers.

14. A weighing method as defined in claim 1, wherein the at least one reference sample container has the same nominal weight as the filled containers.

15. A weighing method as defined in claim 1, wherein said at least one reference sample container has the same nominal weight as the empty containers.

16. A weighing method as defined in claim 1, wherein said at least one reference sample container is filled with a desired quantity of material.

17. A weighing apparatus for weighing containers of pharmaceutical, medical, food substances, comprising
    (a) a weighing unit having at least two weighing devices for weighing containers filled with a desired quantity of substance to obtain an actual weight value of the containers and also having at least one further weighing device for weighing at least one reference container having a known weight, shape and size to obtain an actual weight value of said at least one reference sample container;

(b) a covering and protecting structure arranged to contain and protect said weighing unit;
(c) a laminar flow generating unit configured to generate a controlled laminar air flow inside the covering and protecting structure; and
(d) a control unit connected with said weighing unit and configured to execute the calculating, estimating, comparing and correcting steps of the method defined in claim 1.

* * * * *